United States Patent
Miki et al.

(10) Patent No.: US 9,173,123 B2
(45) Date of Patent: Oct. 27, 2015

(54) BASE STATION APPARATUS, MOBILE TERMINAL APPARATUS AND COMMUNICATION CONTROL METHOD

(75) Inventors: Nobuhiko Miki, Tokyo (JP); Tetsushi Abe, Tokyo (JP); Yusuke Ohwatari, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 254 days.

(21) Appl. No.: 13/877,178

(22) PCT Filed: Oct. 3, 2011

(86) PCT No.: PCT/JP2011/072750
§ 371 (c)(1),
(2), (4) Date: May 8, 2013

(87) PCT Pub. No.: WO2012/046684
PCT Pub. Date: Apr. 12, 2012

(65) Prior Publication Data
US 2013/0223264 A1 Aug. 29, 2013

(30) Foreign Application Priority Data

Oct. 4, 2010 (JP) ................................ 2010-225178

(51) Int. Cl.
*H04W 24/10* (2009.01)
*H04L 1/00* (2006.01)
(Continued)

(52) U.S. Cl.
CPC ............. *H04W 24/10* (2013.01); *H04J 11/005* (2013.01); *H04L 1/0026* (2013.01);
(Continued)

(58) Field of Classification Search
CPC ..... H04W 72/04; H04W 24/10; H04W 72/12; H04W 24/02; H04W 72/042; H04W 72/082; H04W 88/08; H04W 72/0446; H04W 8/22; H04W 36/30; H04W 72/0406; H04W 5/0094; H04W 5/0098; H04W 76/048; H04L 5/0091; H04L 5/0048; H04L 5/0053; H04L 5/0032; H04J 11/005; H04B 17/309
USPC ............... 370/252, 328, 329; 455/450, 452.2, 455/509, 561; 375/295
See application file for complete search history.

(56) References Cited

U.S. PATENT DOCUMENTS 8,305,987 B2 * 11/2012 Fong et al. ..................... 370/329
8,472,539 B2 * 6/2013 Ko et al. ........................ 375/260
(Continued)

OTHER PUBLICATIONS

Ericsson, "Further Considerations on RS Design for LTE-Advanced", Mar. 2009, R1-091322 3GPP TSG-RAN WG1 #56bis, 3 Pages.*
NTT DOCOMO, "MSE Performance Evaluation of RE Muting for Inter-Cell CSI-RS", Jul. 2010, R1-104025, 3GPP TSG RAN WG1 Meeting #61bis, 6 Pages.*
(Continued)

*Primary Examiner* — Edan Orgad
*Assistant Examiner* — Ivan O Latorre
(74) *Attorney, Agent, or Firm* — Osha Liang LLP

(57) ABSTRACT

The present invention provides a base station apparatus, a mobile terminal apparatus and a communication control method which can improve the accuracy of channel quality estimation. A communication control method includes the steps of: arranging a CSI-RS, which is a reference signal for downlink channel estimation, in resources of subframes for CSI-RS transmission; setting, in the subframes for CSI-RS transmission, resources to which the CSI-RS is allocated in neighboring areas, to be muting resources; and reporting transmission interval information, which indicates a transmission interval of subframes that are set at the same timing in a transmission cycle of a subframe for CSI-RS transmission in a subject area and in a transmission cycle of a subframe for CSI-RS transmission in the neighboring areas, to a mobile terminal apparatus.

13 Claims, 15 Drawing Sheets

(51) Int. Cl.
- *H04J 11/00* (2006.01)
- *H04W 24/02* (2009.01)
- *H04L 5/00* (2006.01)
- *H04B 17/309* (2015.01)
- *H04W 76/04* (2009.01)
- *H04W 72/12* (2009.01)

(52) U.S. Cl.
CPC ............ *H04L 5/0053* (2013.01); *H04W 24/02* (2013.01); *H04B 17/309* (2015.01); *H04W 72/12* (2013.01); *H04W 76/048* (2013.01)

(56) References Cited

U.S. PATENT DOCUMENTS

| | | | |
|---|---|---|---|
| 2011/0317657 A1* | 12/2011 | Chmiel et al. | 370/331 |
| 2012/0120903 A1* | 5/2012 | Kim et al. | 370/329 |
| 2012/0264441 A1* | 10/2012 | Chandrasekhar et al. | 455/450 |

OTHER PUBLICATIONS

International Search Report issued in PCT/JP2011/072750 mailed Jan. 10, 2012 (3 pages).

NTT DOCOMO, "Signaling to Support PDSCH Muting", 3GPP TSG RAN WG1 Meeting #62bis; R1-105434; Xian, China; Oct. 11-15, 2010 (8 pages).

NTT DOCOMO, "Views on PDSCH Muting", 3GPP TSG RAN WG1 Meeting #62; R1-104932; Madrid, Spain; Aug. 23-27, 2010 (6 pages).

NTT DOCOMO, "Signaling to Support CSI-RS", 3GPP TSG RAN WG1 Meeting #62; R1-104930; Madrid, Spain; Aug. 23-27, 2010 (10 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

* cited by examiner

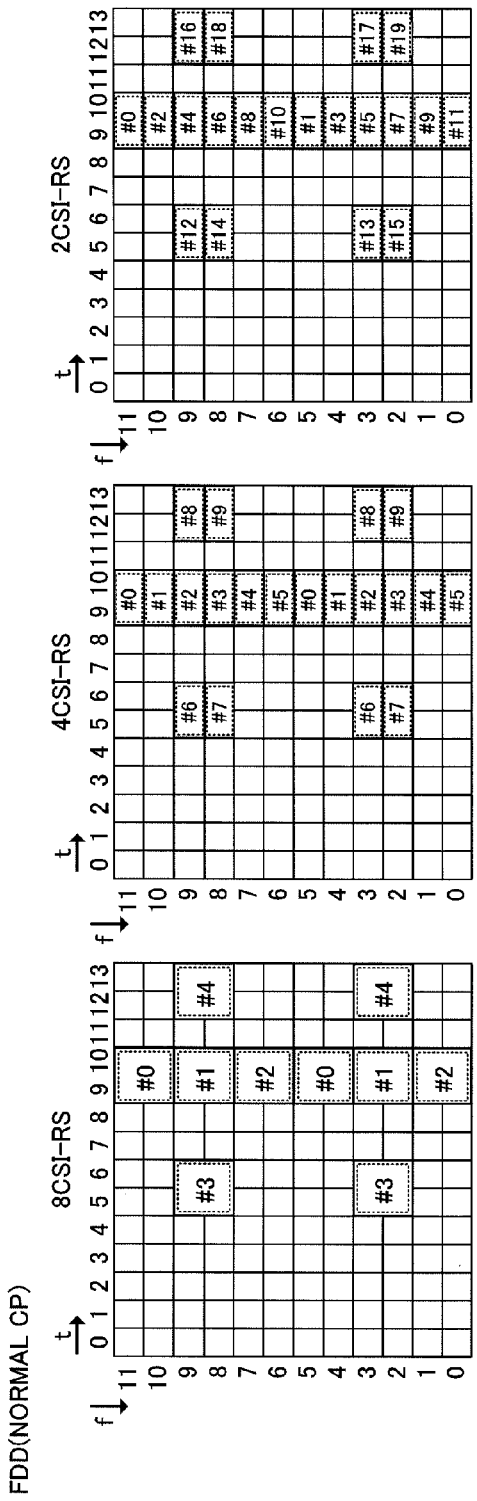
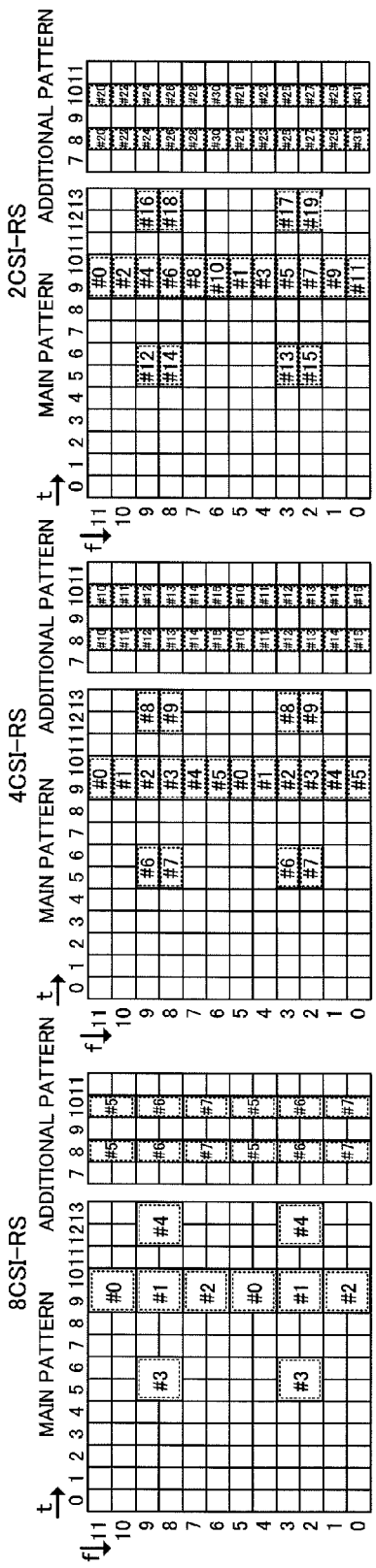
FIG. 3A  FIG. 3B  FIG. 3C
FIG. 3D  FIG. 3E  FIG. 3F

BASE STATION APPARATUS, MOBILE TERMINAL APPARATUS AND COMMUNICATION CONTROL METHOD

TECHNICAL FIELD

The present invention relates to a base station apparatus, a mobile terminal apparatus and a communication control method in a next-generation mobile communication system.

BACKGROUND ART

In a UMTS (Universal Mobile Telecommunications System) network, for the purposes of improving spectral efficiency and improving data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (see, for example, Non-Patent Literature 1).

In the third-generation mobile communication system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems to LTE have been under study (for example, LTE Advanced (LTE-A)). Accordingly, in the future, it is expected that these multiple mobile communication systems will coexist, and configurations (radio base station apparatus, mobile terminal apparatus, etc.) that are capable of supporting these multiple systems will become necessary.

On the downlink of the LTE system, the CRS (Common Reference Signal), which is a cell-common reference signal, is defined. The CRS is used to demodulate transmission data, and, besides, used to measure downlink channel quality (CQI: Channel Quality Indicator) for scheduling and adaptive control, and to measure an average downlink propagation path state for cell search and handover (mobility measurement).

On the other hand, in the downlink of a successor system of LTE (LTE-A system), the CSI-RS (Channel State Information-Reference Signal) for dedicated use of CQI measurement is under study. The CSI-RS supports CQI measurement in a plurality of cells, taking into account coordinated multiple-point (CoMP) data channel signal transmission/reception. The CSI-RS is used for CQI measurement in neighboring cells, and, in this regard, is different from the CRS, which is used for CQI measurement in the serving cell alone.

CITATION LIST

Non-Patent Literature

Non-Patent Literature 1: 3GPP, TR25.912 (V7.1.0), "Feasibility study for Evolved UTRA and UTRAN," September 2006

SUMMARY OF INVENTION

Technical Problem

Now, in CQI measurement using the CSI-RS, muting is studied for the purpose of improving the accuracy of channel quality estimation against interference from neighboring cells, and to realize better accuracy of estimation.

The present invention has been made in view of the above, and it is therefore an object of the present invention to provide a base station apparatus, a mobile terminal apparatus and a communication control method which can improve the accuracy of channel quality estimation.

Solution to Problem

A base station apparatus according to the present invention has: a CSI-RS allocation section that allocates a CSI-RS (Channel State Information-Reference Signal), which is a reference signal for downlink channel estimation, to resources of subframes for CSI-RS transmission; a muting resource setting section that sets, in the subframes for CSI-RS transmission, resources in which the CSI-RS is allocated in neighboring cells, to be muting resources; and a reporting section that reports transmission interval information, which indicates a transmission interval of subframes that are set at the same timing in a transmission cycle of a subframe for CSI-RS transmission in a subject area and in a transmission cycle of a subframe for CSI-RS transmission in the neighboring areas, to a mobile terminal apparatus.

Technical Advantage of the Invention

According to the present invention, a mobile terminal apparatus performs channel estimation in subframes for CSI-RS transmission that are set at the same timing in the subject cell and neighboring cells. Consequently, even when the transmission cycle of subframe for CSI-RS transmission varies between a plurality of areas, it is possible to maintain the accuracy of channel quality estimation in a mobile terminal apparatus at a certain level. In this way, it is possible to provide a base station apparatus, a mobile terminal apparatus and a communication control method which can improve the accuracy of channel quality estimation.

BRIEF DESCRIPTION OF DRAWINGS

FIG. 3 provides diagrams to explain a CSI-RS allocation configuration;

DESCRIPTION OF EMBODIMENTS

First, before explaining the method of signaling muting resources according to the present invention, the CRS (Common Reference Signal), which is defined on the downlink of the LTE system, and the CSI-RS (Channel State Information-Reference Signal), which is agreed to be adopted on the downlink of the LTE-A system, will be described.

FIG. 1 provides diagrams for explaining the configuration of the CRS. FIG. 1 is a diagram to explain a CRS allocation configuration. The CRS is allocated to all resource blocks and all subframes. The CRS is transmitted to a mobile terminal apparatus in a predetermined frequency, time, transmission power, and phase, as a cell-common reference signal. These frequency and transmission power of the CRS are identified on the mobile terminal apparatus side by a cell ID, a broadcast signal and so on, which will be described later. The CRS is used for user data demodulation in the mobile terminal apparatus and also used in downlink channel measurement. Channel measurement using the CRS includes downlink channel quality (CQI: Channel Quality Indicator) measurement for scheduling and adaptive control, and average propagation path state measurement (mobility measurement) for cell search and handover.

Figure 1A:
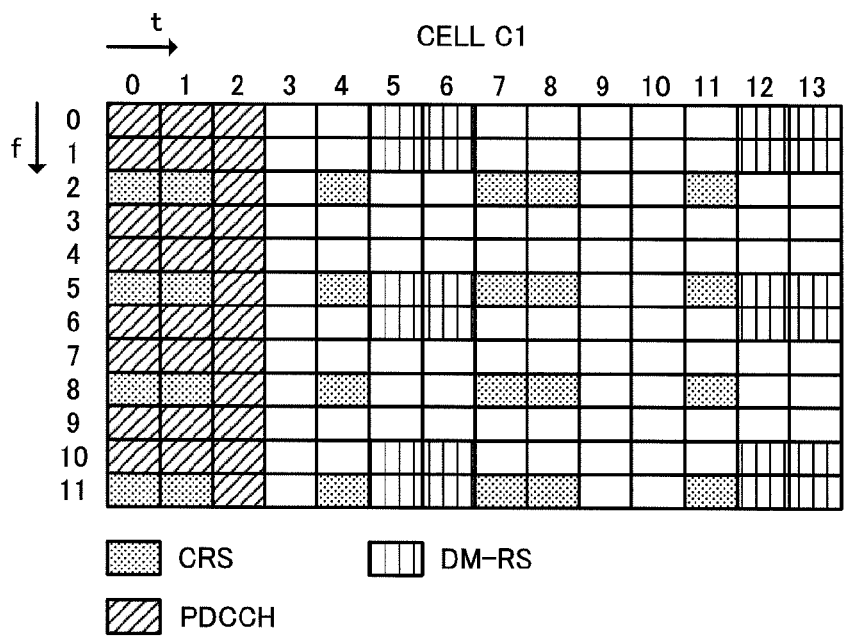
FIG. 1 provides diagrams to explain a CRS allocation configuration.
Figure 1B:
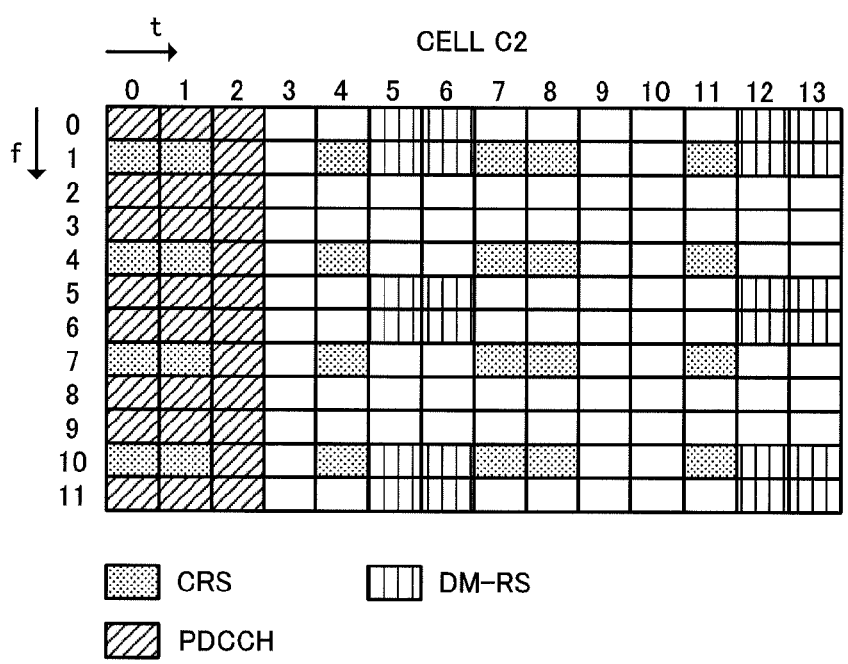

As shown in FIG. 1A, in one resource block defined in LTE, the CRS is allocated not to overlap user data and the DM-RS (Demodulation-Reference Signal). One resource block is formed with twelve subcarriers that are consecutive in the frequency direction and fourteen symbols that are consecutive in the time axis direction. Also, as shown in FIG. 1B, the CRS is shifted in the frequency direction on a per cell basis, and therefore interference between neighboring cells is reduced. In the example shown in FIG. 1, the CRSs in cell C2 are mapped to be shifted by one subcarrier in the frequency direction with respect to the CRSs of cell C1.

The CRS is specified by parameters such as position, sequence and transmission power. Among these parameters, the resources to be allocated to the CRS are associated with a cell ID. That is to say, since the position of the CRS that is shifted in the frequency direction is determined by a cell ID, the mobile terminal apparatus specifies the CRS allocation configuration by identifying the cell ID of the serving cell. The sequence of the CRS is associated with a cell ID, and the transmission power is reported by a broadcast signal. Note that the cell ID for specifying the position and sequence of the CRS is identified by the mobile terminal apparatus through cell search.

Figure 2:
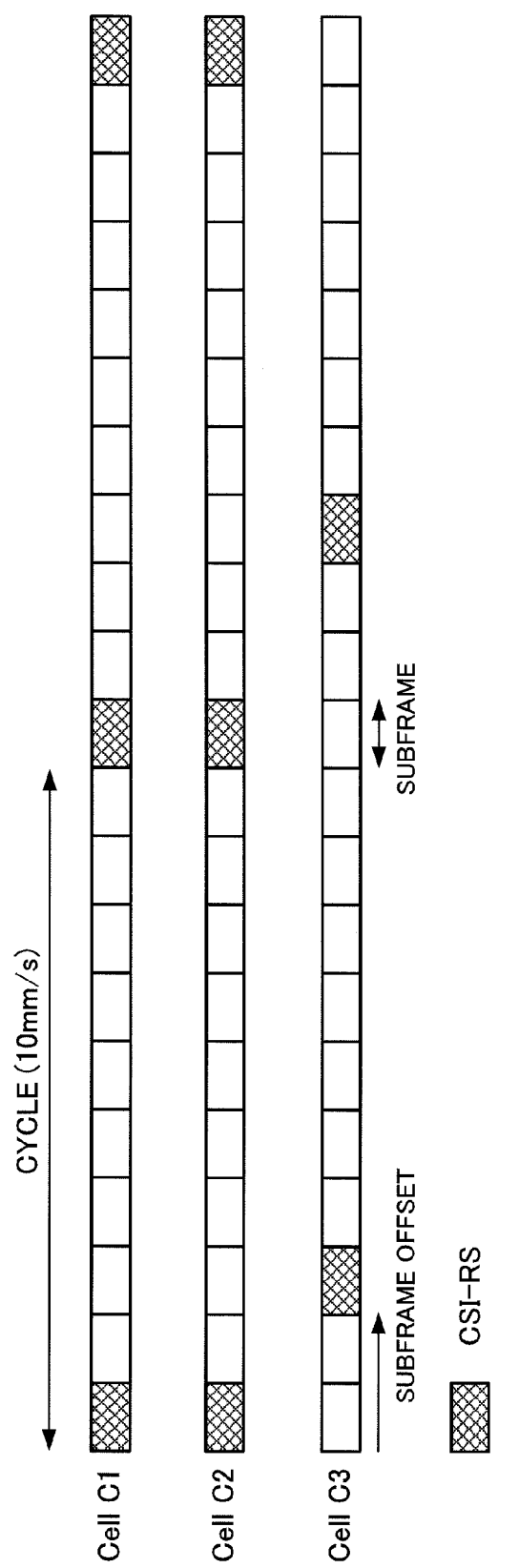
FIG. 2 is a diagram to explain a CSI-RS subframe structure.

Next, the CSI-RS structure that is studied for the downlink of the LTE-A system will be described. The CRS is allocated to all resource blocks and all subframes, but the CSI-RS is allocated in a predetermined cycle. For example, in the subframe structure shown in FIG. 2, in cell C1 and cell C2, the CSI-RS is allocated every ten subframes. Also, in cell C3, the CSI-RS is offset two subframes with respect to cell C1 and cell C2, and is allocated every ten subframes.

Also, considering coordinated multiple-point data channel signal transmission/reception, the CSI-RS is designed such that it is taken into account that CQI measurement is performed not only in the serving cell but also is performed in neighboring cells as well. On the other hand, similar to the CRS, the CSI-RS is specified by parameters such as position, sequence and transmission power. The position of the CSI-RS includes subframe offset, cycle and subcarrier-symbol offset (CSI-RS index).

Subframe offset represents the amount of deviation from the top subframe. Subframe offset is associated with a cell ID or reported by a broadcast signal. The cycle represents the repetition cycle of subframes for CSI-RS transmission, and is set to 10 msec in FIG. 2. The cycle is reported by a broadcast signal. Subcarrier-symbol offset represents resources to allocate to the CSI-RS in resource blocks. Subcarrier-symbol offset is associated with a cell ID like the CRS, or is reported by a broadcast signal.

The sequence of the CSI-RS is associated with a cell ID, and the transmission power is reported by a broadcast signal. In this way, the mobile terminal apparatus receives a broadcast signal from the base station apparatus, and also identifies the cell ID through cell search, thereby acquiring information that is necessary to receive the CSI-RS.

FIG. 3 is a diagram to explain a CSI-RS allocation configuration. The CSI-RS is allocated not to overlap user data and the DM-RS, in one resource block defined in LTE. From the perspective of reducing PAPR, for resources that can transmit the CSI-RS, a set of two resource elements that neighbor each other in the time axis direction is allocated. In the CSI-RS structure shown in FIG. 3, forty resource elements are secured as CSI-RS resources. In these forty resource elements, the CSI-RS allocation pattern is set according to the number of CSI-RS ports (the number of antennas).

When the number of CSI-RS ports is eight, the CSI-RS is allocated to eight resource elements in forty resource elements. For example, as shown in FIG. 3A, is possible to select one of five patterns (indices #0 to #4). In this case, the same index is assigned to resource elements constituting one pattern. When the number of CSI-RS ports is four, the CSI-RS is allocated to four resource elements in forty resource elements. For example, as shown in FIG. 3B, it is possible to select one of ten patterns (indices #0 to #9).

When the number of CSI-RS ports is two, the CSI-RS is allocated to two resource elements in forty resource elements. For example, as shown in FIG. 3C, it is possible to select one from twenty patterns (indices #0 to #19). With the CSI-RS, a different allocation pattern is selected every cell, so that it is possible to reduce interference between neighboring cells. Also, the CSI-RS allocation pattern may be a pattern to which TDD patterns are added as an FDD option as shown in FIG. 3D to FIG. 3F, besides the FDD normal patterns shown in FIG. 3A to FIG. 3C. Furthermore, the CSI-RS allocation pattern may be an extended pattern, which enhances the normal pattern studied in LTE Rel. 10. In the following description, an example of an FDD normal pattern will be described for ease of explanation.

Figure 4A:
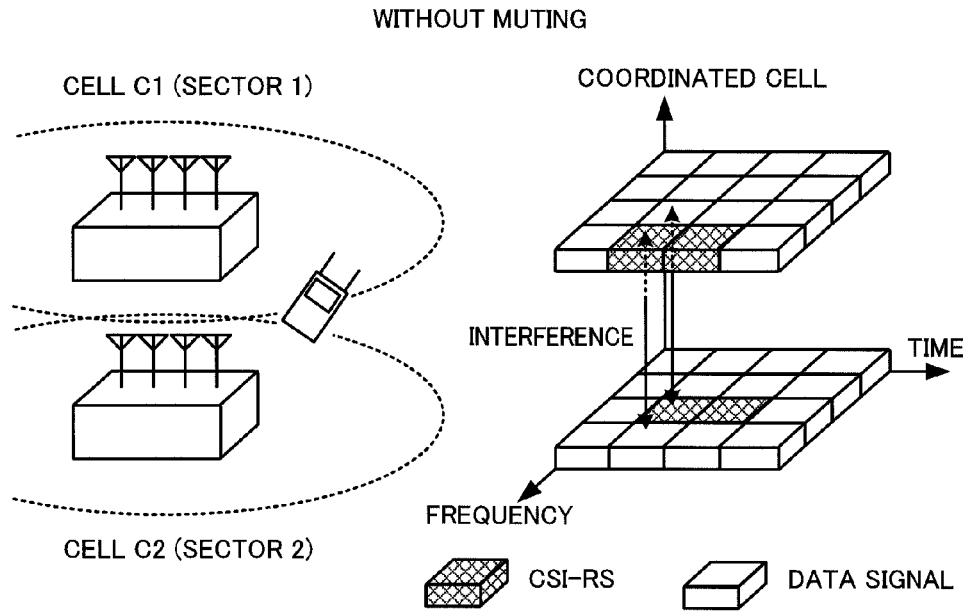
FIG. 4 provides diagrams to explain muting in CQI measurement using the CSI-RS.

Now, as described above, considering coordinated multiple-point data channel signal transmission/reception, the CSI-RS is designed such that it is taken into account that CQI measurement is performed not only in the serving cell but also is performed in neighboring cells as well. In CQI measurement using the CSI-RS, cases might occur where the accuracy of measurement is degraded due to data interference from neighboring cells. For example, as shown in FIG. 4A, in downlink resources for cell C1, user data is allocated in association with the CSI-RS of neighboring cell C2. Also, in downlink resources for cell C2, user data is allocated in association with the CSI-RS of neighboring cell C1. These user data constitutes interference components of the CSI-RS in each cell, and becomes a factor to damage the accuracy of channel quality estimation in the mobile terminal apparatus.

Figure 4B:
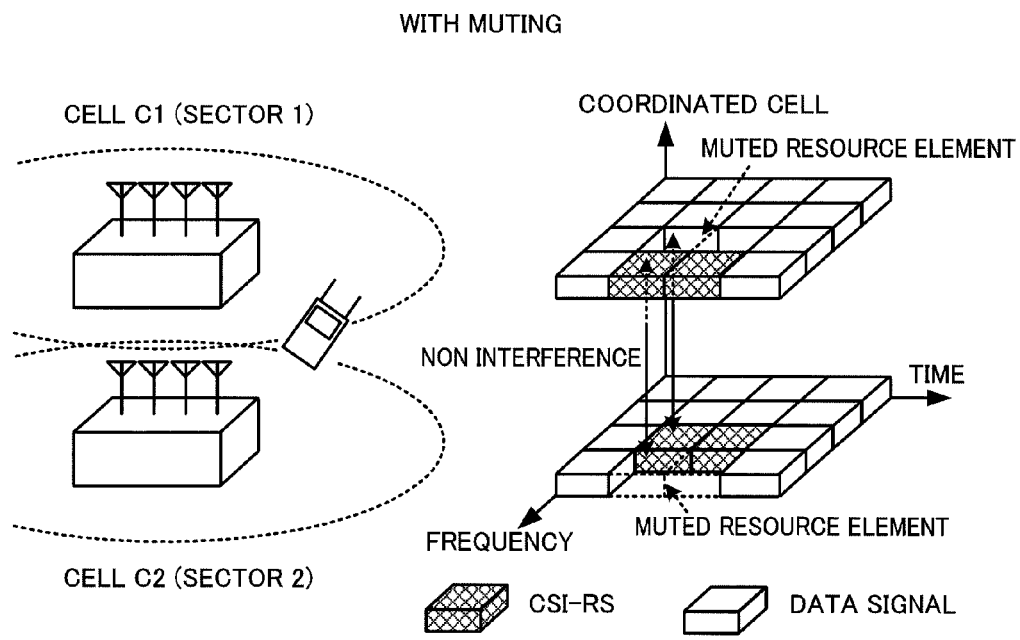

In order to improve the deterioration of the accuracy of channel quality estimation due to the allocation of user data, muting is studied. According to muting, as shown in FIG. 4B, user data is not allocated to resources corresponding to the CSI-RSs of neighboring cells, and, instead, muting resources are set. In the downlink resource block of cell C1, muting resources are set in association with the CSI-RS of cell C2. Furthermore, in the downlink resource block for cell C2, muting resources are set in association with the CSI-RS of cell C1.

Figure 5:
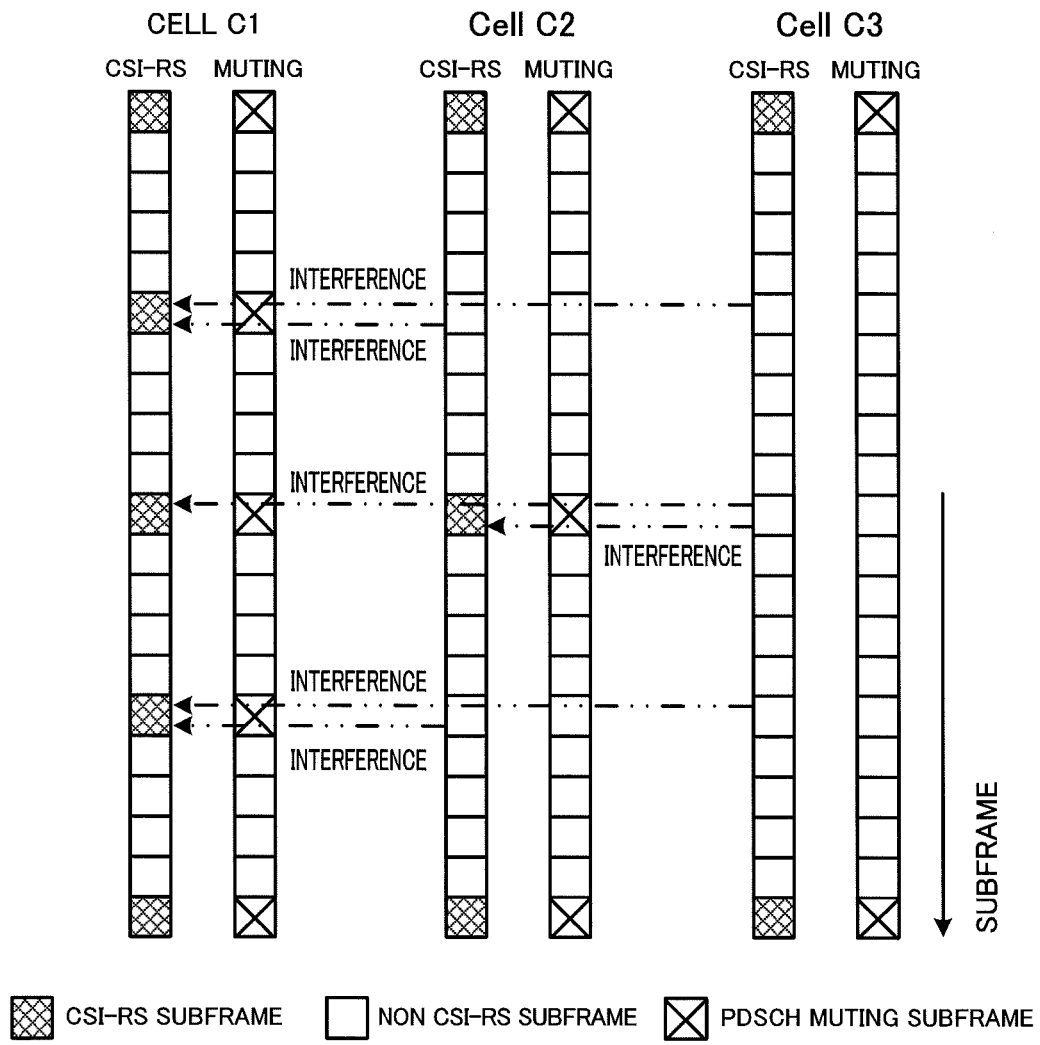
FIG. 5 is a diagram to explain a CSI-RS transmission cycle between neighboring cells.

According to this configuration, interference components of the CSI-RS due to user data of neighboring cells are excluded, and the accuracy of channel quality estimation in the mobile terminal apparatus is improved. However, when the transmission cycle of the CSI-RS varies between neighboring cells, a problem occurs where deviation is produced in the setting timing of muting and the accuracy of channel quality estimation is deteriorated. For example, as shown in FIG. 5, in cell C1, a subframe for CSI-RS transmission is transmitted every five subframes (5 msec). Meanwhile, in cell C2, a subframe for CSI-RS transmission is transmitted every ten subframes (10 msec), and, in cell C3, a subframe for CSI-RS transmission is transmitted every twenty subframes (20 msec).

In this case, there is timing where the mobile terminal apparatus receives a subframe for CSI-RS transmission from cell C1 and receives subframes that are not for CSI-RS transmission from cell C2 and cell C3. At such timing, in the subframe for CSI-RS transmission for cell C1, muting is set with respect to cell C2 and cell C3. However, in the subframes not for CSI-RS transmission for cell C2 and cell C3, muting is not set with respect to cell C1. The mobile terminal apparatus performs channel estimation for cell C1 using a CSI-RS that is damaged by interference from cell C2 and cell C3, and therefore it is not possible to maintain the accuracy of estimation at a certain level.

Also, when muting is applied mutually between neighboring cells, the data channel of the subject cell is not transmitted for the neighboring cell, and therefore it is necessary to report the positions of muting resources to the mobile terminal apparatus. This is because rate matching is performed in the base station apparatus to avoid the muting resources, and therefore the mobile terminal apparatus has to identify the muting resources and perform de-rate matching. If the mobile terminal apparatus fails to identify the muting resources, the demodulation process is applied to the muting resources as well, and therefore the throughput of the demodulation process and the accuracy of demodulation are deteriorated.

The present inventors have arrived at the present invention in order to solve this problem. That is to say, the first gist of the present invention is to allow channel estimation in the mobile terminal apparatus to be performed with certain accuracy of estimation, by performing channel estimation in subframes for CSI-RS transmission that are set at the same timing between neighboring cells. Also, a second gist of the present invention is to improve the throughput of the demodulation process and the accuracy of demodulation by the mobile terminal apparatus, by signaling muting resources.

First, before explaining muting according to the present invention, CQI measurement using the CSI-RS will be described. CQI measurement using the CSI-RS is different from CQI measurement using the CRS and is performed with respect to neighboring cells as well, in addition to the serving cell. In this way, channel quality is measured in a plurality of cells in order to take into account coordinated multiple-point user data transmission/reception.

Figure 6:
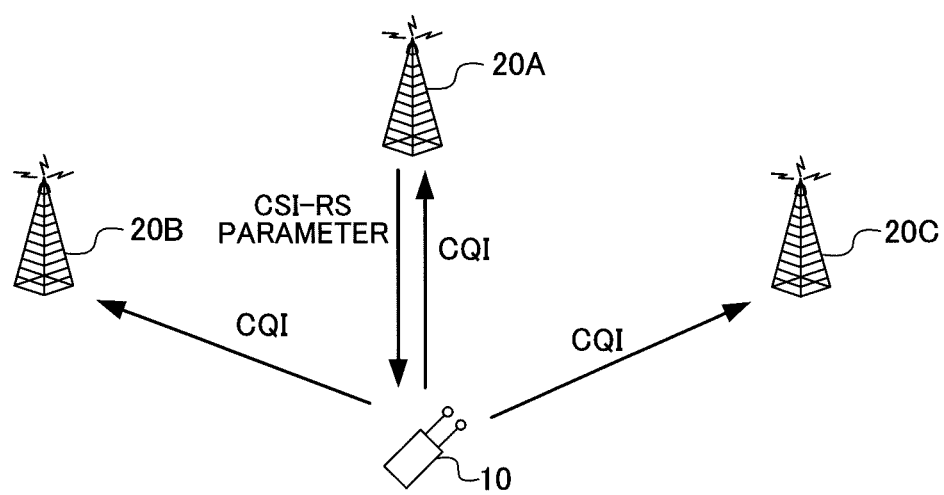
FIG. 6 is a diagram to explain a method of CQI measurement in neighboring cells.

CQI measurement in neighboring cells will be described with reference to FIG. 6. FIG. 6 is a diagram to explain a method of measuring CQI in neighboring cells.

As shown in FIG. 6, a base station apparatus 20A set in the serving cell is connected to be able to transmit and receive CSI-RS parameters with base station apparatuses 20B and 20C that are set in neighboring cells. The mode of connection between the base station apparatuses 20A, 20B and 20C is not particularly limited, and either wired connection or wireless connection may be used. In this system, parameters such as the position, sequence and transmission power of the CSI-RS and so on are transmitted from the base station apparatuses 20B and 20C of neighboring cells to the base station apparatus 20A of the serving cell. The base station apparatus 20A generates a broadcast signal including the CSI-RS parameters received from the base station apparatuses 20B and 20C and the CSI-RS parameters of the subject cell, and transmits the broadcast signal to the mobile terminal apparatus 10.

The position and transmission power of the CSI-RS are included in the CSI-RS parameters in the serving cell. Also, the cell IDs of the neighboring cells, and the positions, sequences and transmission power of the CSI-RSs are included in the CSI-RS parameters of the neighboring cells. The mobile terminal apparatus 10 performs CQI measurement in neighboring cells by specifying the positions, sequences and transmission power of the CSI-RSs of the neighboring cells, by means of the broadcast signal from the serving cell. The sequence of the CSI-RS in the serving cell is associated with the cell ID, and identified by the mobile terminal apparatus 10 through cell search.

The mobile terminal apparatus 10 feeds back the measured CQIs to the base station apparatus 20A of the serving cell and the base station apparatuses 20B and 20C of the neighboring cells. Alternately, the measured CQIs may be fed back to the base station apparatus 20A of the serving cell, and reported to and shared by the base station apparatuses 20B and 20C of the connecting neighboring cells. The CQIs that are fed back to the base station apparatuses 20A, 20B and 20C are used to determine the parameters (for example, MCS: Modulation and Coding Scheme) upon transmitting user data the mobile terminal apparatus 10. In this way, by exchanging the CSI-RS parameters between cells, CQI measurement is made possible not only in the serving cell but also in neighboring cells as well, in the mobile terminal apparatus 10.

In CQI measurement using the CSI-RS, as described above, muting is effective for the purpose of improving the accuracy of CQI measurement against interference from neighboring cells. Muting is made possible by setting the resources where the CSI-RS is allocated in neighboring cells, to be muting resources (null).

As described above, when the transmission cycle of the CSI-RS varies between the serving cell and neighboring cells, deviation is produced in the setting timing of muting, and therefore it is not possible to maintain the accuracy of channel quality estimation at a certain level. Consequently, the mobile terminal apparatus 10 performs channel estimation in subframes in which the transmission timing of the CSI-RS matches between a plurality of cells. The mobile terminal apparatus 10 specifies these subframes for channel estimation based transmission interval information that is reported from the base station apparatus 20A. The transmission interval information is reported from the base station apparatus 20A of the serving cell to the mobile terminal apparatus 10 via the broadcast channel.

Also, the mobile terminal apparatus 10 identifies whether or not muting is applied, based on muting resource specifying information that is reported from the base station apparatus 20A, identifies that the data of that position is not subject to transmission, and identifies the number of resource elements allocated to data. The muting resource specifying information is reported from the base station apparatus 20 to the mobile terminal apparatus 10 via a broadcast channel.

Figure 7:
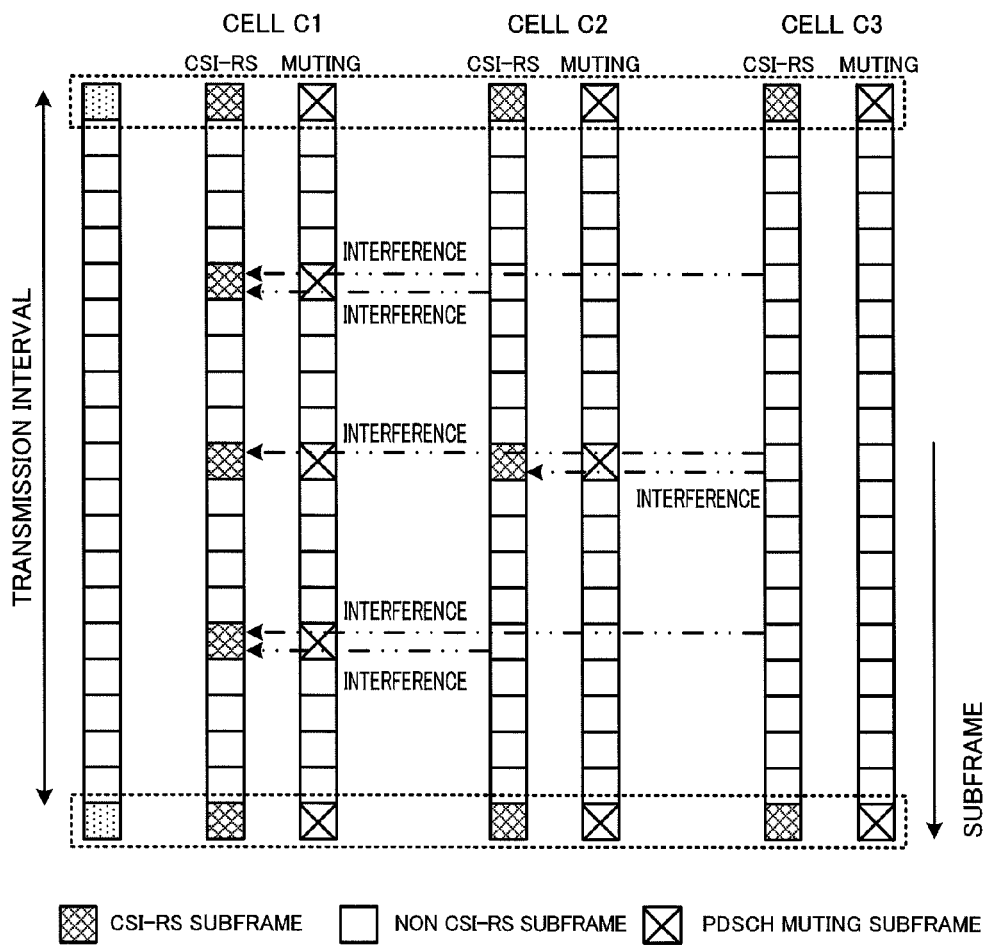
FIG. 7 is a diagram to show an example of channel estimation timing by a mobile terminal apparatus.

The timing of channel estimation by the mobile terminal apparatus will be described with reference to FIG. 7. FIG. 7 is a diagram to show an example of channel estimation timing by a mobile terminal apparatus. Note that, for ease of explanation, cell C1 to cell C3 are assumed to be designed to synchronize with each other.

As shown in FIG. 7, in cell C1, a subframe for CSI-RS transmission is transmitted every five subframes (5 msec), in cell C2, a subframe for CSI-RS transmission is transmitted every ten subframes (10 msec), and, in cell C3, a subframe for CSI-RS transmission is transmitted every twenty subframes (20 msec). In this case, at the timing shown by the broken lines, subframes for CSI-RS transmission are transmitted from cells C1 to C3 to the mobile terminal apparatus. The mobile terminal apparatus is able maintain the accuracy of channel estimation at a certain level by performing channel estimation at this timing and avoiding subframes damaged by data interference from the neighboring cells.

To be more specific, at the timing shown by the broken lines, in the subframes for CSI-RS transmission for cell C1, muting is set with respect to cell C2 and cell C3. In subframes of cell C2, muting is set with respect to cell C1 and cell C3. In subframes of cell C3, muting is set with respect to cell C1 and cell C2. Consequently, the CSI-RS does not receive interference from user data of the neighboring cells.

Between a plurality of cells C1 to C3, subframes in which the transmission timing of the CSI-RS matches are set on a regular basis. In the example of FIG. 7, subframes in which the transmission timing of the CSI-RS matches are set at a transmission interval of twenty subframes (20 msec). This regular subframe transmission interval is reported from the base station apparatus to the mobile terminal apparatus by transmission interval information. In this case, the base station apparatus of the serving cell acquires the cycle of the CSI-RS from the base station apparatuses of the neighboring cells and generates transmission interval information based on the cycles of the CSI-RSs of the serving cell and the neighboring cells. The mobile terminal apparatus is able to improve the accuracy of estimation of channel estimation by receiving the transmission interval information and performing channel estimation only in subframes in which the transmission timing of the CSI-RS matches between a plurality of cells.

Note that, although the present embodiment is configured to report subframes in which the transmission timing of the CSI-RS matches between a plurality of cells from the base station apparatus to the mobile terminal apparatus, this configuration is by no means limiting. It is equally possible to provide a configuration in which the mobile terminal apparatus acquires the CSI-RS cycle from a plurality of cells and identifies subframes in which the transmission timing of the CSI-RS matches between the plurality of cells. This configuration makes signaling of transmission interval information unnecessary, so that it is possible to reduce the number of signaling bits.

The muting reporting method will be described with reference to FIG. 8 and FIG. 10. First, the first muting reporting method will be described. FIG. 8 provides diagrams to show examples of the first muting reporting method. FIG. 9 provides diagrams showing other examples of the first muting reporting method.

The first muting reporting method reports muting resource specifying information in block units, where a plurality of CSI-RS resources are one block (one unit). For example, when the number of CSI-RS ports is four, muting resource specifying information is reported in 2×1 resource element units, and, when the number of CSI-RS ports is eight, muting resource specifying information is reported in 2×2 resource element units. In this case, it is possible to report muting resource specifying information in a bitmap format, in which the indices by which the CSI-RS resources are numbered, and whether or not muting is applied are associated on a one-by-one basis.

Figure 8A:
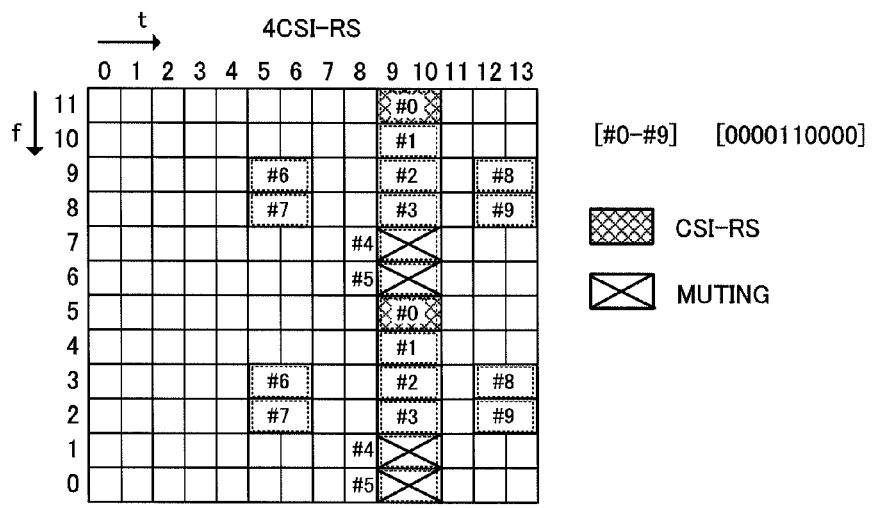
FIG. 8 provides diagrams to show examples of the first muting reporting method.

FIG. 8A shows an allocation pattern in the event the number of CSI-RS ports is four. To be more specific, the CSI-RS resources of indices #4 and #5 are set to be muting resources. In this case, [0000110000] is reported as bitmap information, in association with indices [#0-#9]. In the bitmap information, "1" is set in muting positions, and "0" is set in positions where muting does not apply. Also, by setting all "0," it is possible to report that muting is not applied.

Figure 8B:
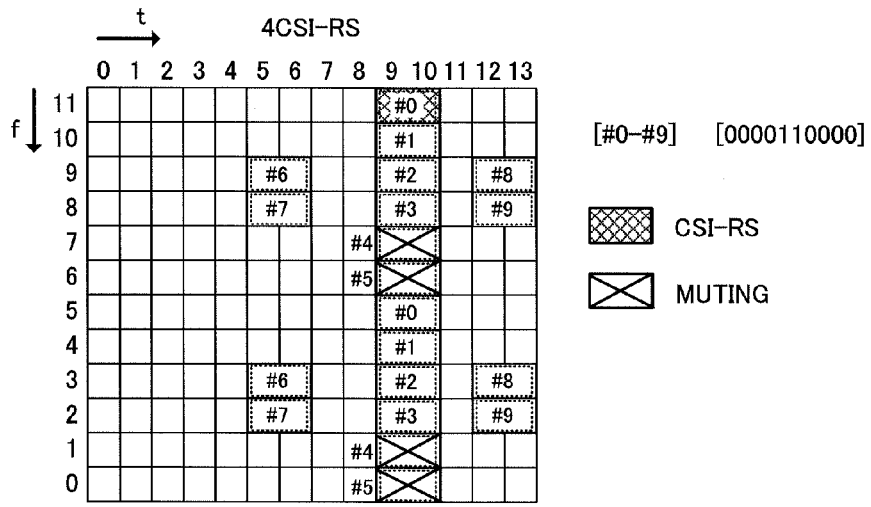

With this bitmap-based reporting method, it is possible to reduce the number of signaling bits by reporting muting resources via CSI-RS ports of a smaller number of ports, using a CSI-RS port allocation pattern of a larger number of ports. For example, when muting resources are reported by two CSI-RS ports using an allocation pattern of two CSI-RS ports, the number of signaling bits to be required is twenty bits, to correspond to indices [#0-#19]. By contrast with this, as shown in FIG. 8B, when muting resources are reported by two CSI-RS ports using an allocation pattern of four CSI-RS ports, it is possible to reduce the number of signaling bits to ten bits, using indices [#0-#9].

Figure 8C:
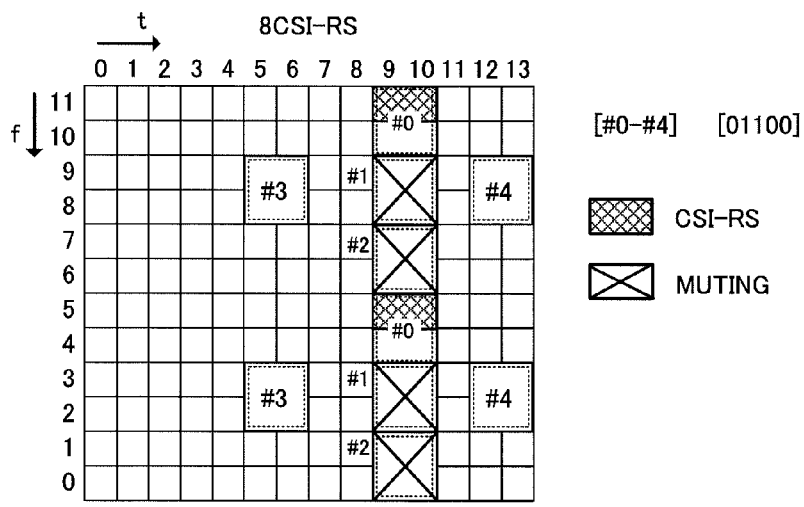

Also, when muting resources are reported by four CSI-RS ports using an allocation pattern of four CSI-RS ports, the number of signaling bits to be required is ten bits, to correspond to indices [#0-#9]. By contrast with this, as shown in FIG. 8C, when muting resources are reported by four CSI-RS ports using an allocation pattern of eight CSI-RS ports, it is possible to reduce the number of signaling bits to five bits, using indices [#0-#4]. Note that, in the bitmap information, may be set in muting positions, and "1" may be set in positions where muting does not apply.

Note that the first muting reporting method is by no means limited to a bitmap-based reporting method, and, as long as muting resource specifying information is reported in block units, any reporting method may be used. For example, as shown in FIG. 9, it is equally possible to report muting resource specifying information by defining a muting resource allocation pattern, apart from the CSI-RS allocation pattern, and using the muting resource allocation pattern. For the muting resource allocation pattern, for example, it is possible to use the first block pattern having a relatively small number of muting resources and a second block pattern having a relatively large number of muting resources.

Figure 9A:
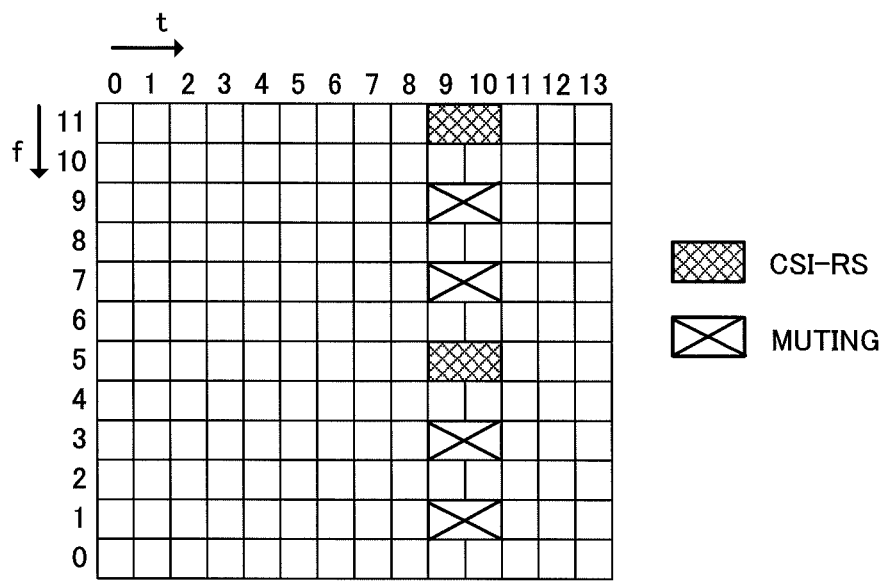
FIG. 9 provides diagrams to show other examples of the first muting reporting method.

As shown in FIG. 9A, according to the first block pattern, in symbols #9 and #10, as opposed to resources to which the CSI-RS is allocated, a plurality of CSI-RS resources that are allocated every other subcarrier are grouped into one and made a block. Consequently, the CSI-RS or muting resources are set every other subcarrier. With the first block pattern, although it is possible to make the number of muting resources smaller and secure more resources to allocate to user data, there is a possibility that interference against the CSI-RS from neighboring cells cannot be suppressed.

Figure 9B:
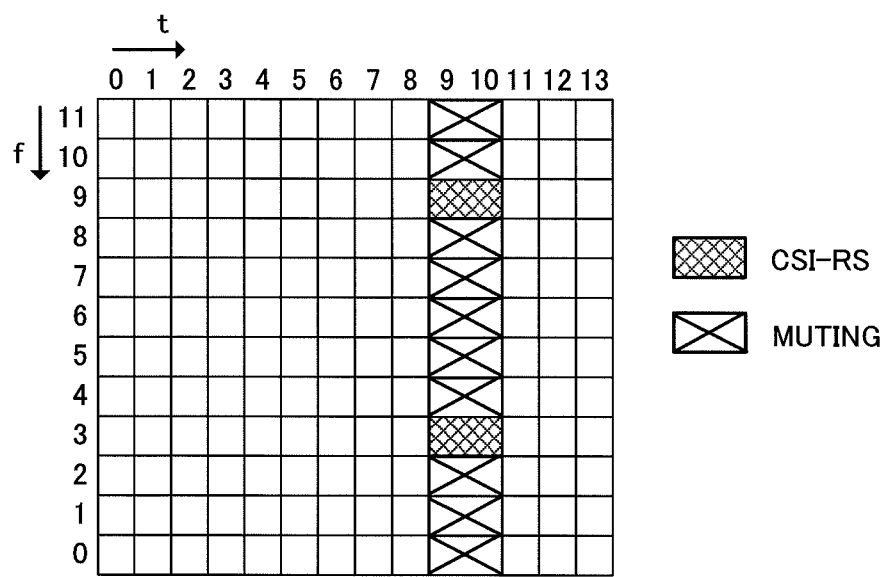

On the other hand, as shown in FIG. 9B, in the second block pattern, in symbols #9 and #10, CSI-RS resources, apart from the resources in which the CSI-RS is allocated, are made a block. Consequently, muting resources are set in resources other than the resources in which the CSI-RS is allocated. In the second block pattern, although it is possible to suppress interference against the CSI-RS from neighboring cells compared to the first block pattern, the muting resources increase, and the resources to be allocated to user data are reduced.

When there are two types of muting resource allocation patterns, the first block pattern and the second block pattern are reported by one bit. For example, in the first block pattern, "0" is reported as muting resource specifying information, and, in the second block pattern, "1" is reported as muting resource specifying information. By means of this configuration, it is possible to reduce the number of signaling bits significantly.

Note that the first and second block patterns may be defined in advance between the base station apparatus and the mobile terminal apparatus or may be synchronized at predetermined timing. Also, it is equally possible to report "1" as muting resource specifying information in the first block pattern and report "0" as muting resource specifying information in the second block pattern. Also, the allocation pattern of muting resources is by no means limited to the first and second block patterns, as long as patterns are defined for allocation of muting resources.

Next, the second muting reporting method will be described. FIG. 10 provides diagrams showing examples of the second muting reporting method.

The second muting reporting method reports muting resource specifying information by the number of CSI-RS ports in neighboring cells and the indices by which the CSI-RS resources are numbered. The number of CSI-RS ports of the neighboring cells is used to select the CSI-RS allocation pattern in the neighboring cells. The indices are used to specify the muting resources that correspond to the resources in which the CSI-RSs of the neighboring cells are allocated, from the CSI-RS resources corresponding to the CSI-RS allocation pattern. This second muting reporting method uses a CSI-RS signal, so that it is no longer necessary to define a new signal for muting.

Figure 10A:
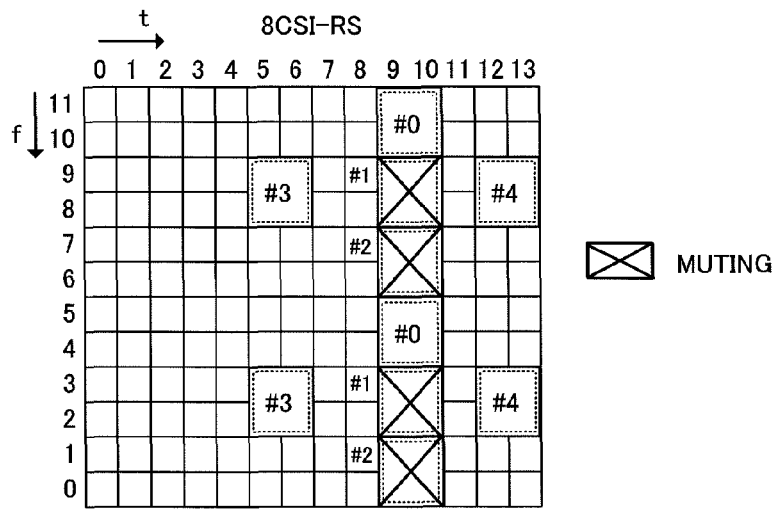
FIG. 10 provides diagrams to show examples of a second muting reporting method.

FIG. 10A shows a CSI-RS allocation pattern in the event the number of CSI-RS ports is eight in all of the serving cell and neighboring cells. In this allocation pattern, muting resources are set in five patterns, by indices #0 #4, and therefore one index is reported by three bits. Also, given that the number of CSI-RS ports is in three types, namely eight ports, four ports, and two ports, so that reporting of the number of CSI-RS ports requires minimum two bits. In FIG. 10A, the CSI-RS resources of indices #1 and #2 are set as muting resources. Consequently, as muting resource specifying information, six bits to report the indices, and four bits to report the number of CSI-RS ports, totaling in ten bits, are reported.

Figure 10B:
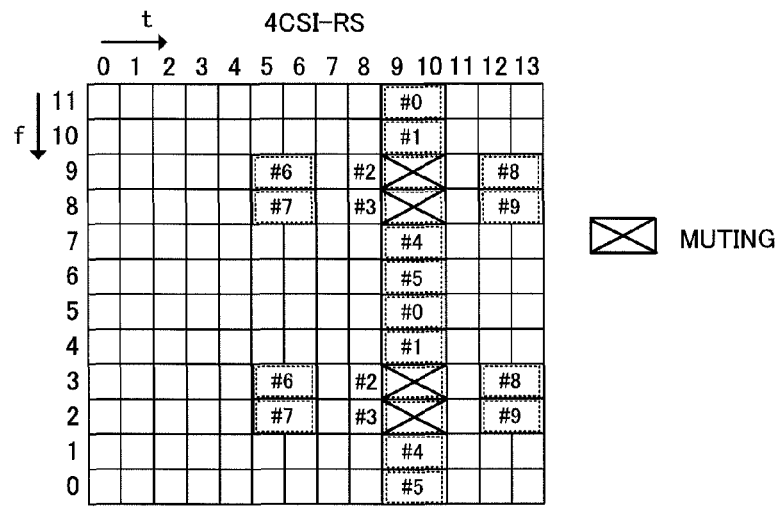

FIG. 10B shows a CSI-RS allocation pattern in the event the number of CSI-RS ports is four in all of the serving cell and neighboring cells. In this allocation pattern, muting resources are set in ten patterns, by indices #0 to #9, so that one index is reported by four bits. In FIG. 10B, the CSI-RS resources of indices #2 and #3 are set to be muting resources. Consequently, as muting resource specifying information, eight bits to report the indices, and four bits to report the number of CSI-RS ports, totaling in twelve bits, are reported.

Figure 10C:
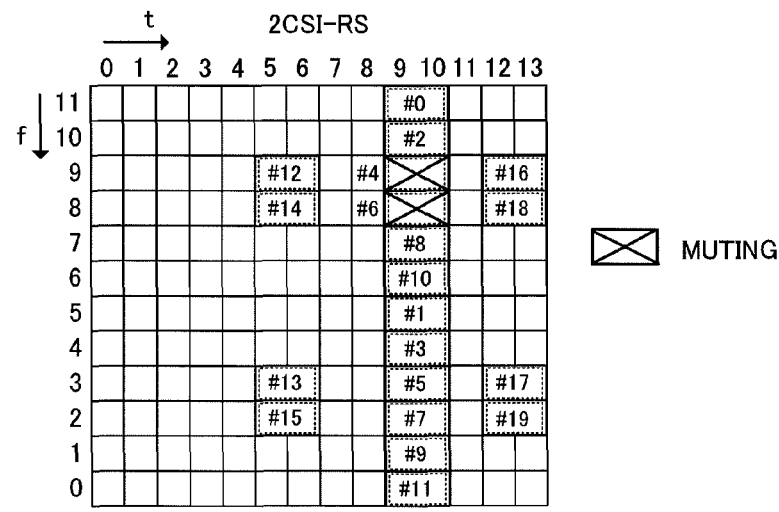

FIG. 10C shows a CSI-RS allocation pattern in the event the number of CSI-RS ports is two in all of the serving cell and neighboring cells. In this allocation pattern, muting resources are set in twenty patterns, by indices #0 to #19, so that one index is reported by five bits. In FIG. 10C, the CSI-RS resources of indices #4 and #6 are set to be muting resources. Consequently, as muting resource specifying information, ten bits to report the indices, and four bits to report the number of CSI-RS ports, totaling in fourteen bits, are reported.

In this way, muting resource specifying information is reported to the mobile terminal apparatus by the first and second muting reporting methods. In this case, the muting resource specifying information is reported via a broadcast channel. By the reporting of muting resources, the mobile terminal apparatus is able to disregard the muting resources and demodulate user data. Consequently, the throughput of the demodulation process and the accuracy of demodulation by the mobile terminal apparatus are improved.

Figure 11:
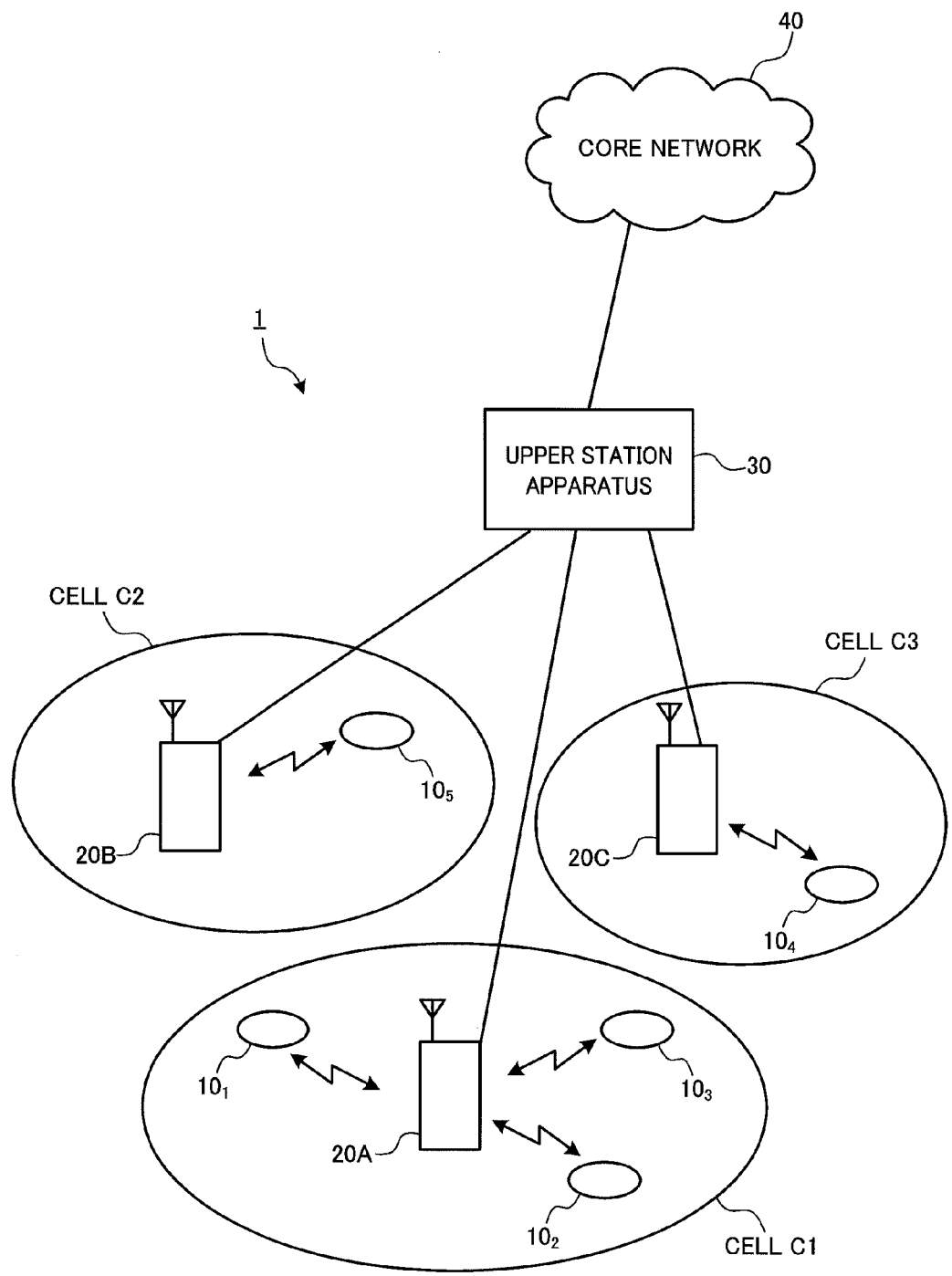
FIG. 11 is a diagram to explain a mobile communication system configuration.

Now, a radio communication system according to an embodiment of the present invention will be described in detail. FIG. 11 is a diagram to explain a system configuration of a radio communication system according to the present embodiment. Note that the radio communication system shown in FIG. 11 is a system to accommodate, for example, the LTE system or SUPER 3G. In this radio communication system, carrier aggregation, which groups a plurality of fundamental frequency blocks into one, where the system band of the LTE system is one unit, is used. Also, this radio communication system may be referred to as IMT-Advanced or may be referred to as 4G.

As shown in FIG. 11, a radio communication system 1 is configured to include base station apparatuses 20A, 20B and 20C, and a plurality of mobile terminal apparatuses 10 ($10_1$, $10_2$, $10_3$, ... $10_n$, where n is an integer to satisfy n>0) that communicate with the base station apparatuses 20A, 20B and 20C. The base station apparatuses 20A, 20B and 20C are connected with an upper station apparatus 30, and this upper station apparatus 30 is connected with a core network 40. The mobile terminal apparatus 10 is able to communicate with the base station apparatuses 20A, 20B and 20C in cells C1, C2 and C3. Note that the upper station apparatus 30 includes, for example, an access gateway apparatus, a radio network controller (RNC), a mobility management entity (MME) and so on, but is by no means limited to these.

Although the mobile terminal apparatuses ($10_1$, $10_2$, $10_3$, ... $10_n$) include LTE terminals and LTE-A terminals, the following description will be given with respect to "mobile terminal apparatus 10," unless specified otherwise. Also, although the mobile terminal apparatus 10 performs radio communication with the base station apparatuses 20A, 20B and 20C for ease of explanation, more generally, user apparatuses (UE: User Equipment) including mobile terminal apparatuses and fixed terminal apparatuses may be used as well.

In the radio communication system 1, although, as radio access schemes, OFDMA (Orthogonal Frequency Division Multiple Access) is applied to the downlink, and SC-FDMA (Single-Carrier Frequency-Division Multiple Access) is applied to the uplink, the uplink radio access schemes are by no means limited to these. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Now, communication channels in the LTE system will be described. Downlink communication channels include a PDSCH (Physical Downlink Shared Channel) as a downlink data channel used by each mobile terminal apparatus 10 on a shared basis, and downlink L1/L2 control channels (PDCCH, PCFICH, PHICH). Transmission data and higher control information are transmitted by means of the PDSCH. PDSCH and PUSCH scheduling information is transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid to ARQ Indicator Channel).

Uplink communication channels include a PUSCH (Physical Uplink Shared Channel) that is an uplink data channel used by each mobile terminal apparatus on a shared basis, and a PUCCH (Physical Uplink Control Channel), which is an uplink control channel. Transmission data and higher control information are transmitted by means of this PUSCH. Also, by means of the PUCCH, downlink radio quality information (CQI: Channel Quality Indicator), ACK/NACK and so on are transmitted.

Figure 12:
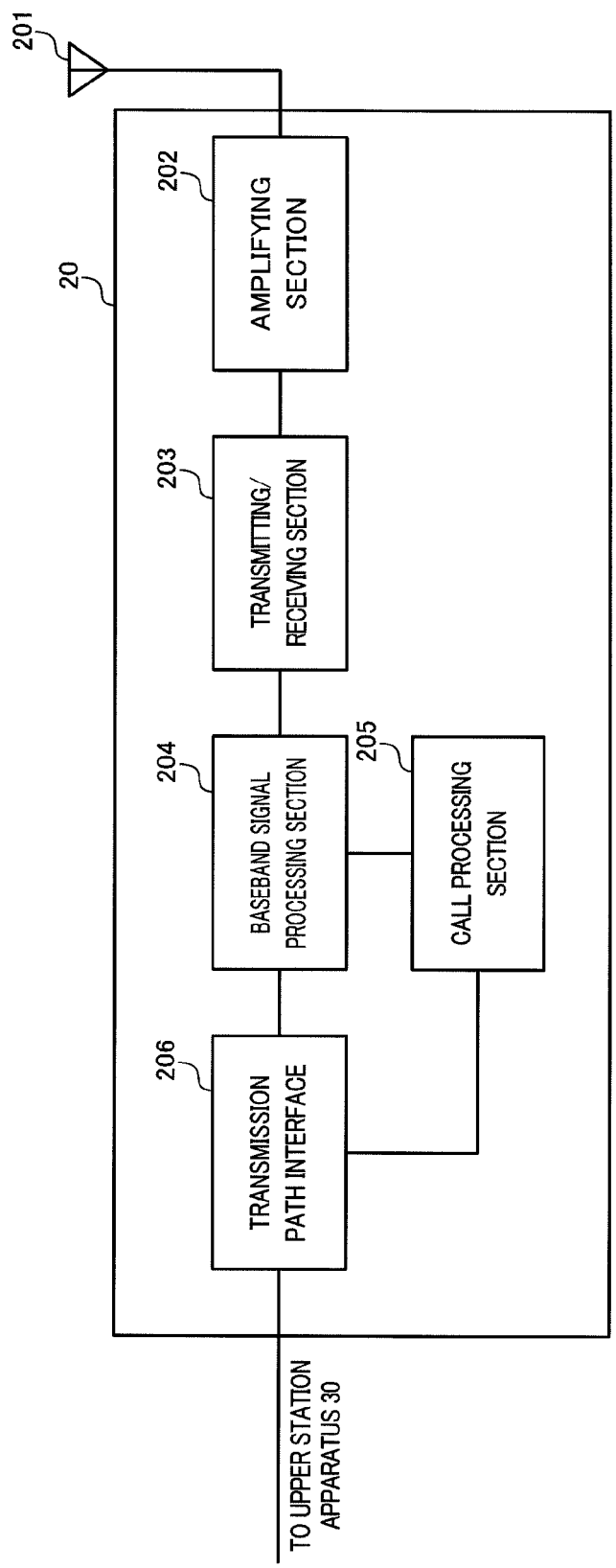
FIG. 12 is a diagram to explain an overall configuration of a base station apparatus.

Referring to FIG. 12, an overall configuration of a base station apparatus according to the present embodiment will be described. Note that the base station apparatuses 20A, 20B and 20C have the same configuration and therefore will be described as "base station apparatus 20." The base station apparatus 20 has a transmitting/receiving antenna 201, an amplifying section 202, a transmitting/receiving section (reporting section) 203, a baseband signal processing section 204, a call processing section 205, and a transmission path interface 206. Transmission data to be transmitted from the base station apparatus 20 to the mobile terminal apparatus 10 on the downlink is input from the upper station apparatus 30 in the baseband signal processing section 204, via the transmission path interface 206.

In the baseband signal processing section 204, a downlink data channel signal is subject to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, as with signals of the physical downlink control channel, which is a downlink control channel, transmission processes such as channel coding and inverse fast Fourier transform are performed.

Also, the baseband signal processing section 204 reports control information for allowing each mobile terminal apparatus 10 to communicate with the base station apparatus 10, to the mobile terminal apparatuses 10 connected to the same cell, by the broadcast channel. Broadcast information for communication in the cell includes, for example, the uplink or downlink system bandwidth, identification information of a root sequence (root sequence index) for generating random access preamble signals in the PRACH, and so on.

In the transmitting/receiving section 203, the baseband signal that is output from the baseband signal processing section 204 is subjected to frequency conversion into a radio frequency band. The amplifying section 202 amplifies the transmission signal subjected to frequency conversion, and outputs the result to the transmitting/receiving antenna 201.

Meanwhile, as for signals to be transmitted on the uplink from the mobile terminal apparatus 10 to the base station apparatus 20, a radio frequency signal that is received in the transmitting/receiving antenna 201 is amplified in the amplifying section 202, subjected to frequency conversion and converted into a baseband signal in the transmitting/receiving section 203, and is input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signal received on the uplink. The decoded signal is transferred to the upper station apparatus 30 through the transmission path interface 206.

The call processing section 205 performs call processes such as setting up and releasing a communication channel, manages the state of the base station apparatus 20 and manages the radio resources.

Figure 13:
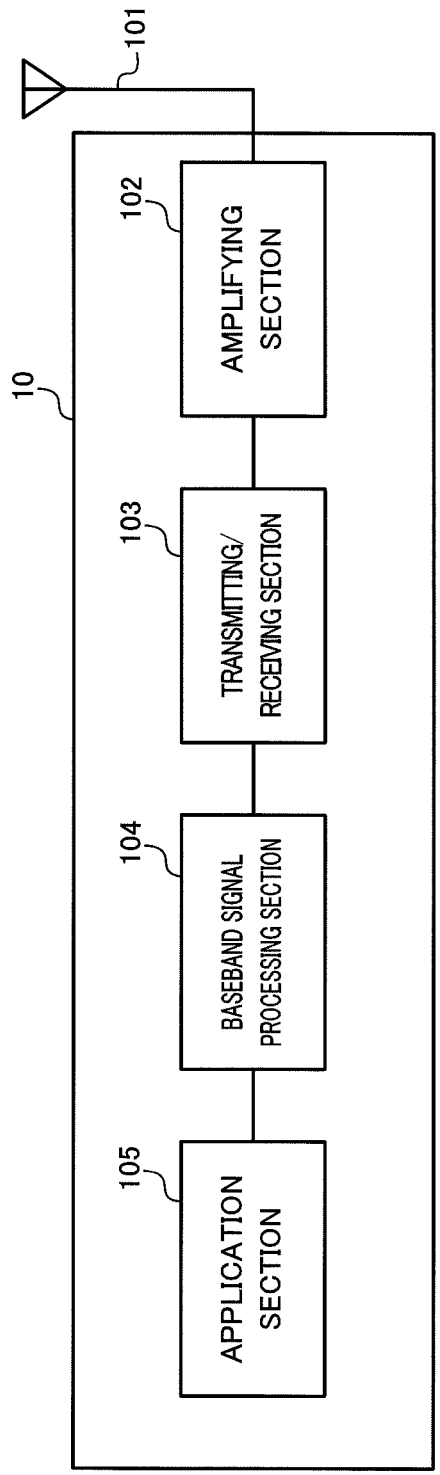
FIG. 13 is a diagram to explain an overall configuration of a mobile terminal apparatus.

Next, referring to FIG. 13, an overall configuration of the mobile terminal apparatus 10 according to the present embodiment will be described. An LTE terminal and an LTE-A terminal have the same hardware configurations in the principle parts, and therefore will be described indiscriminately. The mobile terminal apparatus 10 has a transmitting/receiving antenna 101, an amplifying section 102, a transmitting/receiving section (receiving section) 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control and so on in the baseband signal processing section 104. In this downlink data, downlink transmission data is transferred to the application section 10. The application section 105 performs processes related to upper layers above the physical layer and the MAC layer. Also, in the downlink data, broadcast information is also transferred to the application section 105.

On the other hand, uplink transmission data is input from the application section 105 to the baseband signal processing section 104. The baseband signal processing section 104 performs a mapping process, a retransmission control (HARQ) transmission process, channel coding, a DFT process, and an IFFT process. The baseband signal output from the baseband signal processing section 104 is converted into a radio frequency band in the transmitting/receiving section 103, and, after that, amplified in the amplifying section 102 and transmitted from the transmitting/receiving antenna 101.

Figure 14:
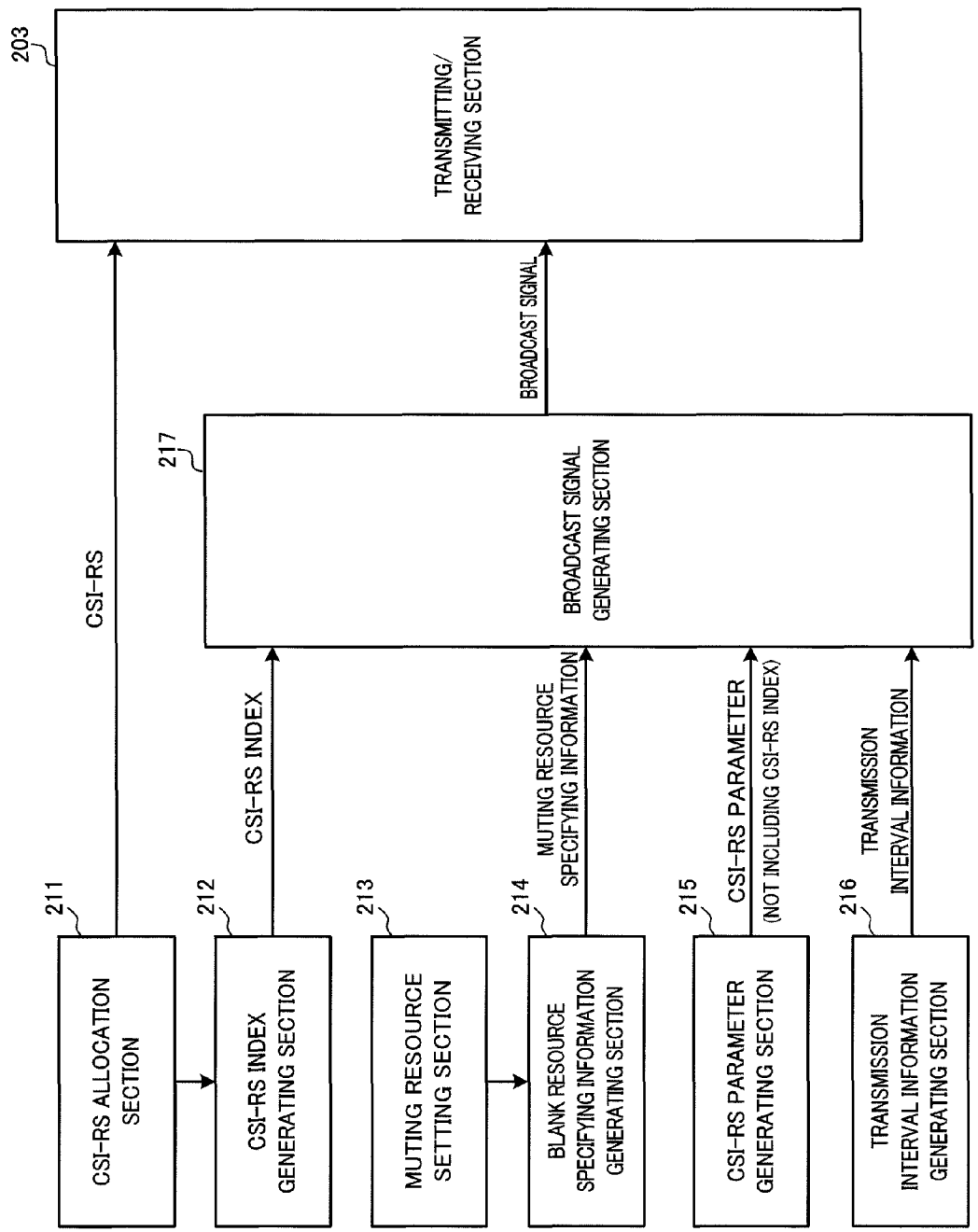
FIG. 14 is a diagram to explain function blocks by which a base station apparatus allows a mobile terminal apparatus to measure CQI.

The function blocks whereby the base station apparatus allows the mobile terminal apparatus to measure CQI will be described with reference to FIG. 14. FIG. 14 is a diagram to explain the function blocks whereby the base station apparatus allows the mobile terminal apparatus to measure CQI. Note that the function blocks of FIG. 14 are primarily the processing content of the baseband processing section. Also, the function blocks shown in FIG. 14 are simplified to explain the present invention, and assumed to have the configurations which a baseband processing section normally has. Also, in the following descriptions, indices for specifying the resources where the CSI-RS is allocated, will be described as CSI-RS indices.

As shown in FIG. 14, the base station apparatus 20 has a CSI-RS allocation section 211, a CSI-RS index generating section 212, a muting resource setting section 213, a muting resource specifying information generating section 214, a CSI-RS parameter generating section 215, a transmission interval information generating section 216, a broadcast signal generating section 217, and a transmitting/receiving section 203.

The CSI-RS allocation section 211 allocates the CSI-RS in accordance with the number of CSI-RS ports, to the CSI-RS transmission resources in resource blocks. The CSI-RS index generating section 212 generates CSI-RS indices that correspond to the resources where the CSI-RS is allocated by the CSI-RS allocation section 211. A CSI-RS index that is generated in the CSI-RS index generating section 212 is input, as one CSI-RS parameter, in the broadcast signal generating section 217.

The muting resource setting section 213 sets the resources corresponding to the resources where the CSI-RS is allocated in the neighboring cells to be muting resources. Note that, with the present embodiment, muting resources may be defined as resources where no data is allocated, or may be defined as resources where data is allocated to an extent where interference is not given against the CSI-RSs of the neighboring cells. Furthermore, muting resources may be defined as resources to be transmitted by transmission power not to give interference against the CSI-RSs of the neighboring cells.

The muting resource specifying information generating section 214 generates the muting resource specifying information used in the first communication control. As the muting resource specifying information, in the first muting reporting method, bitmap information or muting resource allocation pattern is generated, and, in the second muting reporting method, muting resource indices and the number of CSI-RS ports in the neighboring cells are generated.

When the muting resource specifying information is reported to the mobile terminal apparatus 10, on the mobile terminal apparatus 10 side, the resources indicated by the muting resource specifying information are identified as muting resources. The muting resource specifying information is input in the broadcast signal generating section 217 as one muting parameter.

The CSI-RS parameter generating section 215 generates parameters such as the sequence and transmission power of the CSI-RS, besides the CSI-RS indices. The CSI-RS parameters generated in the CSI-RS parameter generating section 215 are input in the broadcast signal generating section 217.

The transmission interval information generating section 216 generates transmission interval information that indicates the transmission interval of subframes in which the transmission timing of the CSI-RS matches between a plurality of cells. The transmission interval information generating section 216 generates transmission interval information based on the transmission cycle of the CSI-RS in the subject cell and the transmission cycle of the CSI-RS in the neighboring cells. The transmission interval information that is generated in the transmission interval information generating section 216 is input in the broadcast signal generating section 217.

The broadcast signal generating section 217 generates a broadcast signal by including the CSI-RS indices, muting resource specifying information, transmission interval information, and other CSI-RS parameters. In this case, the broadcast signal generating section 217 generates a broadcast signal including not only the CSI-RS parameters in the subject cell but also including the CSI-RS parameters of the neighboring cells, which are received via the transmitting/receiving section 203. The transmitting/receiving section 203 transmits the CSI-RS and broadcast signal to the mobile terminal apparatus 10.

Figure 15:
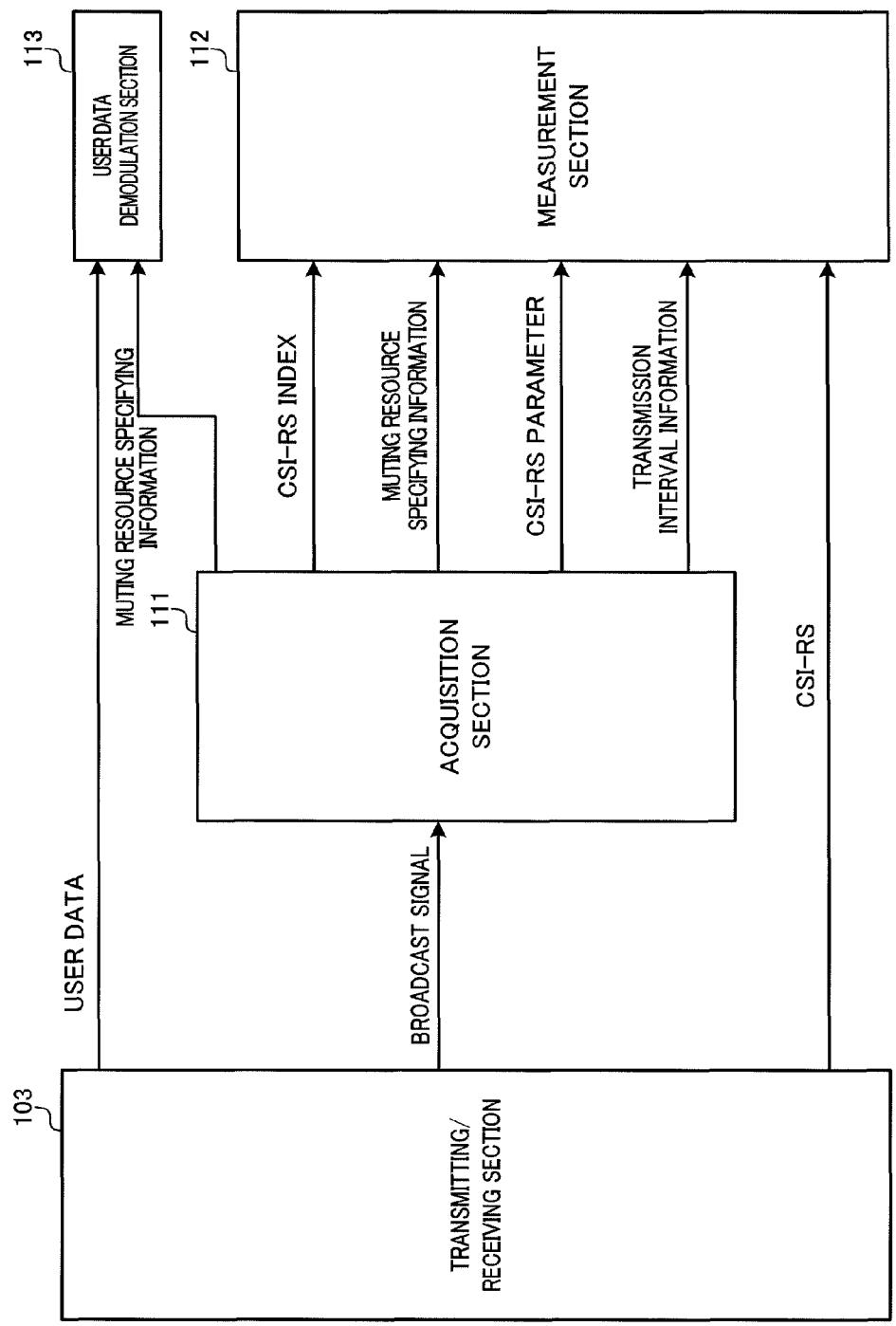
FIG. 15 is a diagram to explain function blocks by which a mobile terminal apparatus mainly measures CQI.

The function blocks of the mobile terminal apparatus for mainly measuring CQI will be described with reference to FIG. 15. FIG. 15 is a diagram to explain the function blocks of a mobile terminal apparatus for mainly measuring CQI. Note that the function blocks of FIG. 15 are primarily the processing content of the baseband processing section. Also, the function blocks shown in FIG. 15 are simplified to explain the present invention, and assumed to have the configurations which a baseband processing section normally has.

As shown in FIG. 15, the mobile terminal apparatus 10 has a transmitting/receiving section 103, an acquisition section 111, a measurement section 112, and a user data demodulation section 113. The transmitting/receiving section 103 receives the CSI-RS and broadcast signal from the base station apparatus 20. The acquisition section 111 acquires the CSI-RS parameters such as the CSI-RS indices, muting parameters such as muting resource specifying information, and transmission interval information, by demodulating the broadcast signal and analyzing the content of the signal.

The measurement section 112 performs CQI measurement at the timing (subframe) shown in the transmission interval information. At this timing, muting resources are set between a plurality of cells, so that the CSI-RS of each cell is not damaged by interference from user data of the neighboring cells. Also, the measurement section 112 measures the CQIs of the serving cell and the neighboring cells from parameters such as position information, sequence and transmission power of the CSI-RSs. In the CQI measurement, it is equally possible to take into account the interference components of the muted resources.

The user data demodulation section 113 demodulates the user data that is received via the transmitting/receiving section 103. The user data demodulation section 113 disregards the muting resources shown in the muting resource specifying information and demodulates the user data. Consequently, the throughput of the demodulation process and the accuracy of demodulation are improved. Note that, instead of providing the user data demodulation section 113, it is equally possible to perform the user data demodulation process in the acquisition section 111.

As described above, with the base station apparatus according to the present embodiment, the mobile terminal apparatus 10 is able to perform channel estimation in subframes for CSI-RS transmission which is set in the same timing between a plurality of cells. Consequently, even when the transmission cycle of subframes for CSI-RS transmission varies between a plurality of cells, it is still possible to maintain the accuracy of channel quality estimation in the mobile terminal apparatus 10 to a certain level. By reporting of muting resource specifying information, the mobile terminal apparatus 10 is able to disregard the muting resources and demodulate user data. Consequently, it is possible to improve the throughput of the demodulation process and the accuracy of demodulation by the mobile terminal apparatus.

Also, although the present embodiment has been described above to have a configuration in which a base station apparatus reports transmission interval information and muting resources to a plurality of mobile terminal apparatuses together by a broadcast signal, this configuration is by no means limiting. It is equally possible to configure the base station apparatus to report transmission interval information and muting resources to mobile terminal apparatuses separately.

Also, although the present embodiment has been described above to have a configuration to improve the accuracy of channel quality estimation by applying muting between a plurality of cells, this configuration is by no means limiting. As long as muting is applied between a plurality of areas, it is then equally possible to apply muting between, for example, a plurality of sectors.

Also, although a mobile terminal apparatus according to the above embodiment has been described to have a configuration in which an acquisition section acquires muting resource specifying information and transmission interval information, this configuration is by no means limiting. The muting resource specifying information and transmission interval information may be configured to be acquired by a function block other than the acquisition section for example, a measurement section.

The present invention is by no means limited to the above embodiment and can be implemented in various modifications. For example, within the scope of the present invention, it is possible to change the setting positions of muting resources, the number of processing sections, the order of steps, and the number of muting resources, as appropriate. Besides, the present invention can be implemented with various changes, without departing from the scope of the present invention.

The disclosure of Japanese Patent Application No. 2010-225178, filed on Oct. 4, 2010, including the specification, drawings and abstract, is incorporated herein by reference in its entirety.

The invention claimed is:

1. A base station comprising:
a CSI-RS (Channel State Information-Reference Signal) allocation section configured to allocate a CSI-RS, which is a reference signal for downlink channel estimation, to resources of subframes for CSI-RS transmission;
a muting resource setting section configured to set in the subframes for CSI-RS transmission, resources to which CSI-RS is allocated in a neighboring area, to be muting resources; and
a reporting section configured to report transmission interval information that indicates an interval between subframes, where transmission timing of the CSI-RS matches between a first transmission cycle and a second transmission cycle, to a mobile apparatus, the first transmission cycle indicating a transmission cycle of a subframe for CSI-RS transmission in a subject area and the second transmission cycle being different from the first transmission cycle and indicating a transmission cycle of a subframe for CSI-RS transmission in the neighboring area.

2. The base station apparatus according to claim 1, wherein the reporting section reports muting resource specifying information for specifying the muting resources, to the mobile terminal apparatus.

3. The base station apparatus according to claim 2, wherein:
the muting resource setting section makes a plurality of resources for the CSI-RS that are defined for CSI-RS transmission be a block, and sets the muting resources in the resources for the CSI-RS in block units; and
the reporting section reports block information that indicates blocks in which the muting resources are set, to the mobile terminal apparatus, as the muting resource specifying information.

4. The base station apparatus according to claim 3, wherein:
the CSI-RS allocation section allocates CSI-RS to the resources for the CSI-RS that are defined for CSI-RS transmission, according to an allocation pattern of CSI-RS that is defined in accordance with the number of CSI-RS ports;
the muting resource setting section sets the muting resources in the resources for the CSI-RS that are made a block in the allocation pattern; and
the reporting section reports bitmap information, which is in a bitmap format associating setting positions of the muting resources with the block, to the mobile terminal apparatus, as the muting resource specifying information.

5. The base station apparatus according to claim 3, wherein:
the muting resource setting section sets the muting resources based on one of a first block pattern having a relatively small number of muting resources and a second block pattern having a relatively large number of muting resources, in the resources for the CSI-RS that are defined for CSI-RS transmission; and
the reporting section reports pattern information which indicates one of the first block pattern and the second block pattern, to the mobile terminal apparatus, as the muting resource specifying information.

6. The base station apparatus according to claim 2, wherein:
the muting resource setting section sets, in an allocation pattern of CSI-RS that is defined in accordance with the number of CSI-RS ports in the neighboring area, the muting resources, in the resources for CSI-RS that are indicated by an index of the allocation pattern; and
the reporting section reports the number of CSI-RS ports in the neighboring area and an index that indicates the setting positions of the muting resources, to the mobile terminal apparatus, as the muting resource specifying information.

7. A mobile terminal apparatus comprising:
a receiving section configured to receive transmission interval information form a base station apparatus, the transmission interval information indicating an interval between subframes, where transmission timing of a CSI-RS which is a reference signal for downlink channel estimation matches between a first transmission cycle and a second transmission cycle, resources to which CSI-RS is allocated in a neighboring area being set to be muting resources in subframes for CSI-RS transmission, the first transmission cycle indicating a transmission cycle of a subframe for CSI-RS transmission in a subject area and the second transmission cycle being different from the first transmission cycle and indicating a transmission cycle of a subframe for CSI-RS transmission in the neighboring area; and
a measurement section configured to perform downlink channel estimation at the interval of subframes indicated by the transmission interval information.

8. The mobile terminal apparatus according to claim 7, further comprising a demodulation section configured to demodulate user data from the base station apparatus, wherein:
the receiving section receives muting resources specifying information for specifying muting resources, from the base station apparatus; and
the demodulation section specifies the muting resources based on the muting resource specifying information and demodulates the user data.

9. The mobile terminal apparatus according to claim 8, wherein the receiving section receives, from the base station apparatus, block information which indicates a block into which a plurality of resources for the CSI-RS that are defined for CSI-RS transmission are made, and in which the muting resources are set, as the muting resource specifying information.

10. The mobile terminal apparatus according to claim 9, wherein the receiving section receives, from the base station apparatus, bitmap information, which is in a bitmap format associating setting positions of the muting resources that are set in block units, in a block into which a plurality of resources for the CSI-RS that are defined for CSI-RS transmission are made, according to an allocation pattern of CSI-RS that is defined in accordance with the number of CSI-RS ports, as the muting resource specifying information.

11. The mobile terminal apparatus according to claim 9, wherein the receiving section receives, from the base station apparatus, pattern information which indicates a block pattern that is set in the resources for the CSI-RS that are defined for CSI-RS transmission, and which indicates one of a first block pattern having a relatively small number of muting resources and a second block pattern having a relatively large number of muting resources, as the muting resource specifying information.

12. The mobile terminal apparatus according to claim 8, wherein the receiving section receives, from the base station apparatus, the number of CSI-RS ports in the neighboring area, and an index of an allocation pattern of CSI-RS, defined for CSI-RS transmission according to the number of CSI-RS ports in the neighboring area, which indicates the setting positions of the muting resources, as the muting resource specifying information.

13. A communication method comprising the steps of:
allocating a CSI-RS, which is a reference signal for downlink channel estimation, to resources of subframes for CSI-RS transmission;
setting, in the subframes for CSI-RS transmission, resources to which CSI-RS is allocated in a neighboring area, to be muting resources; and
reporting transmission interval information that indicates an interval between subframes, where transmission timing of the CSI-RS matches between a first transmission cycle and a second transmission cycle, to a mobile terminal apparatus, the first transmission cycle indicating a transmission cycle being different for the first transmission cycle and indicating a transmission cycle of a subframe for CSI-RS transmission in the neighboring area.

* * * * *